(12) United States Patent
Elboim et al.

(10) Patent No.: US 9,311,265 B2
(45) Date of Patent: Apr. 12, 2016

(54) TECHNIQUES FOR IMPROVING THROUGHPUT AND PERFORMANCE OF A DISTRIBUTED INTERCONNECT PERIPHERAL BUS CONNECTED TO A HOST CONTROLLER

(71) Applicant: QUALCOMM INCORPORATED, San Diego, CA (US)

(72) Inventors: Yaron Elboim, Haifa (IL); Ran Vayda, Binyamina (IL); Ran Eliyahu Hay, Rosh Hahayin (IL)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 13/742,803

(22) Filed: Jan. 16, 2013

(65) Prior Publication Data

US 2013/0185517 A1    Jul. 18, 2013

Related U.S. Application Data

(60) Provisional application No. 61/587,460, filed on Jan. 17, 2012.

(51) Int. Cl.
*G06F 13/40* (2006.01)
*G06F 12/08* (2006.01)

(52) U.S. Cl.
CPC ........ *G06F 13/4027* (2013.01); *G06F 12/0862* (2013.01); *G06F 2212/507* (2013.01)

(58) Field of Classification Search
CPC ............ Y02B 60/1228; Y02B 60/1235; G06F 13/385; G06F 12/0862; G06F 12/0875; G06F 12/10; G06F 13/14; G06F 13/38; G06F 13/42; G06F 13/4226; G06F 2212/6028; G06F 3/0659; G06F 12/128; G06F 13/22; G06F 13/28; G06F 13/3625; G06F 13/40; G06F 9/45533; G06F 9/4812; G06F 15/8007; G06F 13/4027; G06F 2003/0692; G06F 2212/507; G06F 3/0601; G06F 3/1204; G06F 3/1236; G09G 2360/121; G09G 2360/125

USPC .................. 711/118, 126, 137, 213, E12.017; 710/100, 105, 107, 112, 315

See application file for complete search history.

(56) References Cited

U.S. PATENT DOCUMENTS

| | | | |
|---|---|---|---|
| 6,219,769 | B1 | 4/2001 | Strongin et al. |
| 6,226,721 | B1 | 5/2001 | Strongin et al. |
| 6,253,288 | B1 | 6/2001 | McAllister et al. |
| 6,298,418 | B1 | 10/2001 | Fujiwara et al. |
| 6,321,307 | B1 | 11/2001 | Maguire et al. |
| 6,381,672 | B1 | 4/2002 | Strongin et al. |
| 6,993,633 | B1 | 1/2006 | Sakakibara et al. |
| 7,047,374 | B2 | 5/2006 | Sah et al. |
| 7,051,195 | B2 | 5/2006 | Gaither et al. |

(Continued)

*Primary Examiner* — Zhuo Li (57) ABSTRACT

A method for accelerating execution of read operations in a distributed interconnect peripheral bus, the distributed interconnect peripheral bus is coupled to a host controller being connected to a universal serial bus (USB) device. The method comprises synchronizing on at least one ring assigned to the USB device; pre-fetching transfer request blocks (TRBs) maintained in the at least one ring, wherein the TRBs are saved in a host memory; saving the pre-fetched TRBs in an internal cache memory; upon reception of a TRB read request from the host controller, serving the request by transferring the requested TRB from the internal cache memory to the host controller; and sending a TRB read completion message to the host controller.

21 Claims, 7 Drawing Sheets

(56) References Cited

U.S. PATENT DOCUMENTS

| | | |
|---|---|---|
| 7,188,209 B2 | 3/2007 | Pettey et al. |
| 7,188,263 B1 | 3/2007 | Rubinstein et al. |
| 7,308,523 B1 | 12/2007 | Ngai |
| 7,600,078 B1 | 10/2009 | Cen et al. |
| 7,627,804 B2 | 12/2009 | Bains |
| 7,631,128 B1 | 12/2009 | Sgrosso et al. |
| 7,937,533 B2 | 5/2011 | Allen, Jr. et al. |
| 8,131,941 B2 | 3/2012 | Kinter |
| 8,417,920 B2 | 4/2013 | Stevens et al. |
| 8,539,163 B1 | 9/2013 | Sivasubramanian et al. |
| 2003/0140202 A1 | 7/2003 | LaBerge |
| 2007/0124341 A1 | 5/2007 | Lango et al. |
| 2007/0130372 A1 | 6/2007 | Irish et al. |
| 2008/0184049 A1 | 7/2008 | Mathur et al. |
| 2009/0089510 A1 | 4/2009 | Lee et al. |
| 2009/0157919 A1 | 6/2009 | Dodson et al. |
| 2011/0066812 A1* | 3/2011 | Qin et al. .............. 711/137 |
| 2011/0222552 A1* | 9/2011 | Mital et al. ............ 370/412 |
| 2012/0166692 A1* | 6/2012 | Wang et al. ............ 710/105 |
| 2013/0185472 A1 | 7/2013 | Elboim et al. |
| 2014/0089592 A1 | 3/2014 | Biswas et al. |

\* cited by examiner

TECHNIQUES FOR IMPROVING THROUGHPUT AND PERFORMANCE OF A DISTRIBUTED INTERCONNECT PERIPHERAL BUS CONNECTED TO A HOST CONTROLLER

CROSS REFERENCE TO RELATED APPLICATIONS

The application claims the benefit of U.S. provisional application No. 61/587,460 filed Jan. 17, 2012, the contents of which are herein incorporated by reference.

TECHNICAL FIELD

The present invention relates generally to interconnect buses for providing peripheral component connectivity over a distributed link.

BACKGROUND

Peripheral component interconnect Express (PCI Express or PCIe) is a high performance, generic and scalable system interconnect used for a wide variety of applications, such as a motherboard-level interconnect, a passive backplane interconnect, and an expansion card interface for add-in boards. The PCIe bus implements a serial, full duplex, multi-lane, point-to-point interconnect, packet-based, and switch-based technology. Current versions of PCIe buses allow for a transfer rate of 2.5 Giga bit per second (Gbps), 5 Gbps, or 8 Gbps, per lane, with up to 32 lanes.

Figure 1A:
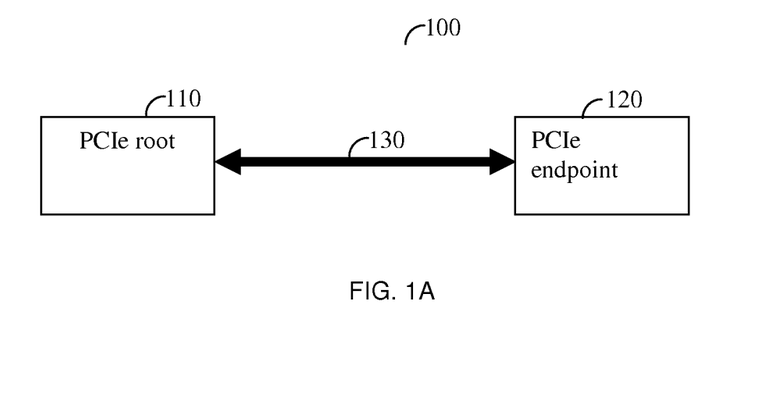
FIG. 1A is a block diagram showing a typical PCIe bus architecture.

The roundtrip time of a PCIe bus is a major factor in degrading the performance of the bus. As illustrated in FIG. 1A, the roundtrip is the time period elapsed from the transmission of data over a link 130, for example, by a PCIe root 110, to the acknowledgment of the data reception by a PCIe endpoint 120.

The roundtrip time of the PCIe bus 100 depends upon the delay of link 130 between the PCIe root 110 and the PCIe endpoint 120. Typically, this delay is due to an acknowledgement (ACK), and flow control update latencies, caused by the layers of a PCIe bus. Abstractly, the PCIe is a layered protocol bus, consisting of a transaction layer, a data link layer, and a physical layer.

The data link layer waits to receive an ACK signal for transaction layer packets during a predefined time window. If an ACK signal is not received during this time window, the transmitter (either at the PCIe root 110 or endpoint 120) resends the unacknowledged packets. This results in inefficient bandwidth utilization of the bus as it requires re-transmission of packets that do not have a data integrity problem. That is, high latency on the link 130 causes poor bandwidth utilization.

In addition, a typical PCIe bus includes a credit mechanism utilized to avoid a receiver buffer overflow. As the latency of a PCIe bus is typically low, the PCIe root 110 and endpoint 120 often implement small receiver buffers with a small number of credits. The fast PCIe link enables fast updates of flow controls (credits) and full bus performance. However, when the bus latency increases, the small number of flow control credits becomes a major limitation. Even if the receiver buffer is available, the flow control packet delay causes the transmitter (either at the PCIe root 110 or endpoint 120) to be idle for a long period prior to sending data. The result is an idle PCIe bus with low bandwidth utilization.

The PCIe protocol allows read and write operations. In the write operation issued between the PCI root and an endpoint, no feedback is required to wait for the completion of the operation. In addition, multiple write operations can be initiated in parallel. However, for a read operation a feedback is required, which indicates completion of the read operation. For example, when a PCIe's root memory reads data from an external disk (connected to the PCIe), the PCIe root should wait for a read completion message from the endpoint connected to the external disk prior to completing the read operation. In addition, only a limited number of read operations can be initiated.

Figure 1B:
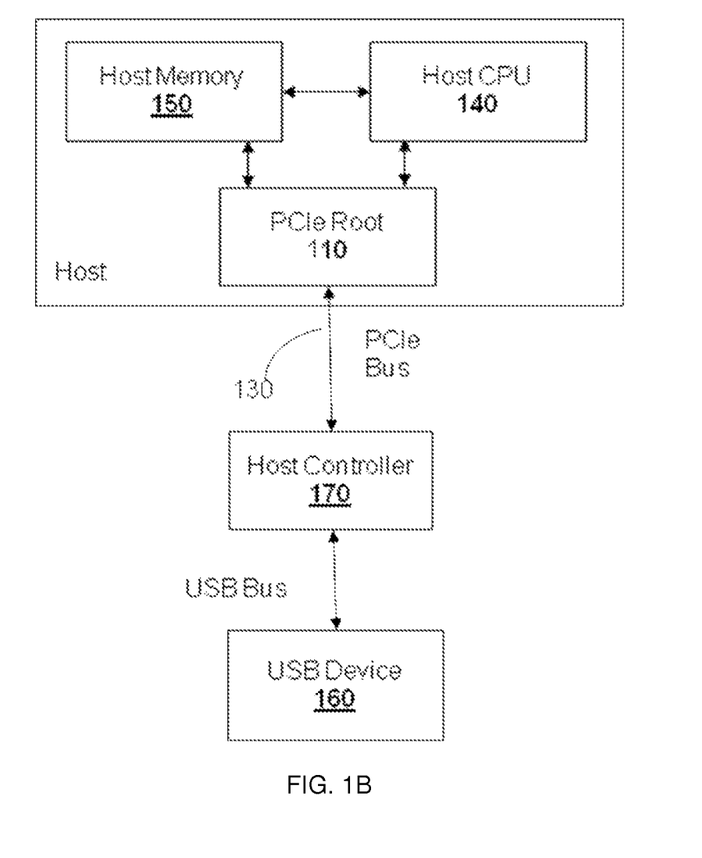
FIG. 1B is a block diagram showing a host architecture connected to a host controller and a USB device.

In a typical architecture of a computing device, illustrated in FIG. 1B, a host central processing unit (CPU) 140 and a host memory 150 are connected to the PCIe root 110. In addition, to allow connectivity to at least one Universal Serial bus (USB) device 160, an eXtensible host controller interface (referred to hereinafter as a "host controller" 170) is coupled to the PCIe bus 130 and a USB device 160. The host controller 170 is a computer interface specification that defines a register-level description of a host controller for USB 1.x, 2.0, and 3.0 compatible devices. The communication between the host controller 170 and the PCIe root 110 is through a PCIe bus connection 130, and the connection between the USB device 160 and the PCIe root 110 is through a host controller 170 by means of a USB device.

A typical host controller 170 supports asynchronous and periodic data transfers between a host memory and the USB device. The periodic data transfers include isochronous and interrupt transfers, while the asynchronous data transfers include a "bulk" and control data transfers. The host controller 170 maintains the following operational rings: a) a command ring through which the software application executed by the host computer relays passes at least host controller related commands; b) an event ring through which command completion and asynchronous events are transferred to a software application; and c) a transfer ring through which the software application schedules the work items for a USB device 160 and transfers data between the host memory 150 and USB device 160.

Multiple command rings, event rings, and transfer rings can be maintained by the host controller 170. A ring is a circular queue of transfer request blocks (TRBs). A TRB is a data structure in the host memory 150 created by the software application. A TRB is used to transfer a single physically contiguous block of data between the host memory 150 and the host controller 170. The TRB includes a single data buffer pointer that points to the data in the host memory, the length of the data pointed by the TRB, a TRB type, and control information.

The TRBs are managed using Enqueue and Dequeue Pointers set to the address of the first TRB location in the ring. The Enqueue Pointer is managed by the software application and the Dequeue Pointer is managed by the host controller 170. The software application places items in a transfer ring at the Enqueue Pointer, and the host controller 170 executes the respective items from the transfer ring at the Dequeue Pointer. A cycle bit field in a TRB identifies the location of the Enqueue Pointer in a respective ring. Upon completion of the transfer of a TRB, the length and status of the transfer may be reported in a transfer event TRB.

In a typical PCIe bus architecture, the PCIe root 110 is directly coupled to the host controller 170. In fact, the PCIe root 110 and the host controller 170 are typically connected on the same electric board. Thus, the link 130 is a wired electric connection. The roundtrip time is usually very short and therefore the PCIe is not designed for operating properly in high latency. In contrast, a distributed peripheral interconnect bus connects a PCIe root and endpoints that are located remotely from each other. For example, such a distributed bus allows the connectivity between a PCI root and endpoints over a wireless medium.

Figure 3:
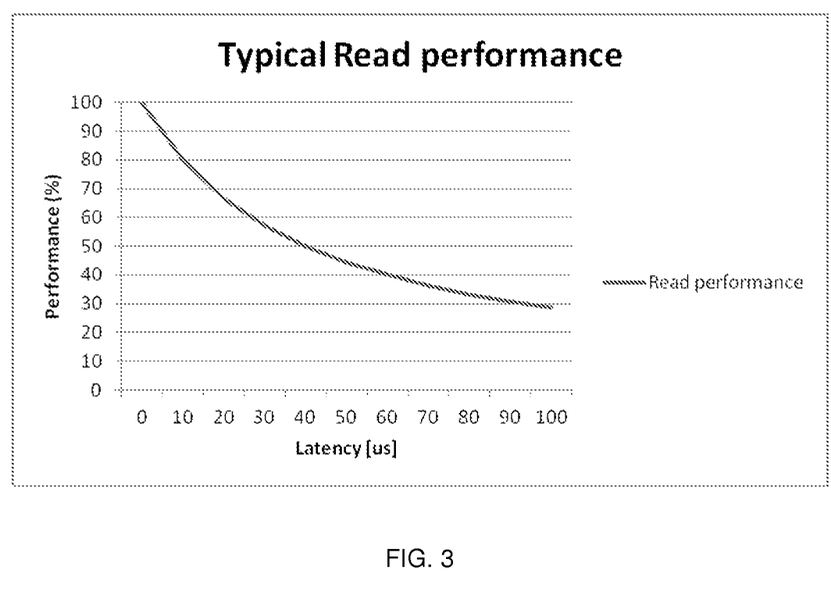
FIG. 3 is a diagram illustrating the performance of read operations in response to the latency of the PCIe bus.

When the link between the components of the PCIe bus is de-coupled, for example, to allow PCIe connectivity over a wireless medium, the latency of the link and response time of a PCI's bus components is significantly increased. As a result, the performance of the bus, especially when performing read operations, is severely degraded. As an example, performance of read operations in response to the latency of the bus is illustrated in FIG. 3, which illustrates that when the latency of a PCIe bus is 0 microseconds (μs) the utilization of the bus is 100%, and when the latency is increased to 100 microseconds (μs), the utilization of the PCIe bus is 30%.

Thus, it would be advantageous to provide a high performance interconnect bus that would allow efficient distributed connectivity.

SUMMARY

Certain embodiments disclosed herein include a method for accelerating execution of read operations in a distributed interconnect peripheral bus, the distributed interconnect peripheral bus is coupled to a host controller being connected to a universal serial bus (USB) device. The method comprises synchronizing on at least one ring assigned to the USB device; pre-fetching transfer request blocks (TRBs) maintained in the at least one ring, wherein the TRBs are saved in a host memory; saving the pre-fetched TRBs in an internal cache memory; upon reception of a TRB read request from the host controller, serving the request by transferring the requested TRB from the internal cache memory to the host controller; and sending a TRB read completion message to the host controller.

Certain embodiments disclosed herein also include a method for accelerating execution of read operations in a distributed interconnect peripheral bus, the distributed interconnect peripheral bus is coupled to a host controller being connected to a universal serial bus (USB) device. The method comprises synchronizing on at least one ring assigned to the USB device; pre-fetching transfer request blocks (TRBs) maintained in the at least one ring, wherein the TRBs are saved in a host memory; for each pre-fetched TRB, retrieving, from the host memory, a data block pointed by the pre-fetched TRB; saving the retrieved data block in a first internal cache memory; upon reception of a data read request from the host controller, serving the request by transferring the requested data block from the first internal cache memory to the host controller; and sending a data read completion message to the host controller.

Certain embodiments disclosed herein also include a distributed interconnect peripheral bus apparatus. The apparatus comprises an upstream bridge connected to a root component of a computing device, wherein the root controller is further coupled to a host memory; and a downstream bridge coupled to a host controller, wherein the downstream bridge includes a controller accelerator configured to accelerate execution of read operations on the distributed interconnect peripheral bus apparatus by perfecting at least one of a transfer request block (TRB) and a data block responsive of read requests issued by the host controller to the host memory, wherein the root component and the host controller communicate over a distributed medium.

Certain embodiments disclosed herein also include a controller accelerator for accelerating execution of read operations in a distributed interconnect peripheral bus, wherein the distributed interconnect peripheral bus connects over a distributed medium between a root component and a host controller, the host controller being connected to a universal serial bus (USB) device and the root component being connected to a host memory. The controller accelerator comprises a synchronization (sync) control unit for synchronizing on the at least one ring assigned to the USB device, wherein the at least one ring maintains transfer request blocks (TRBs) saved in the host memory; a TRB control (TRC) unit including at least a TRC cache memory, wherein the TRC unit is configured to pre-fetch TRBs in the at least one ring and to save the pre-fetched TRBs in the TRC cache memory; and a TRB data control (TDC) control unit including at least a TDC cache memory, wherein the TDC unit is configured to retrieve, from the host memory, data blocks pointed by their respective pre-fetched TRBs and to save the retrieved data blocks in the TDC cache memory.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In view of the shortcomings of the prior art as discussed above, certain embodiments disclosed herein enable improvement of the performance of distributed interconnect peripheral buses, such as a distributed PCIe bus. Specifically, the embodiments disclosed herein allow the acceleration of execution and completion of read operations in such buses where the link between the bus component (e.g., root and endpoint) is de-coupled. In a particular embodiment, the link may be a wireless link.

Figure 2:
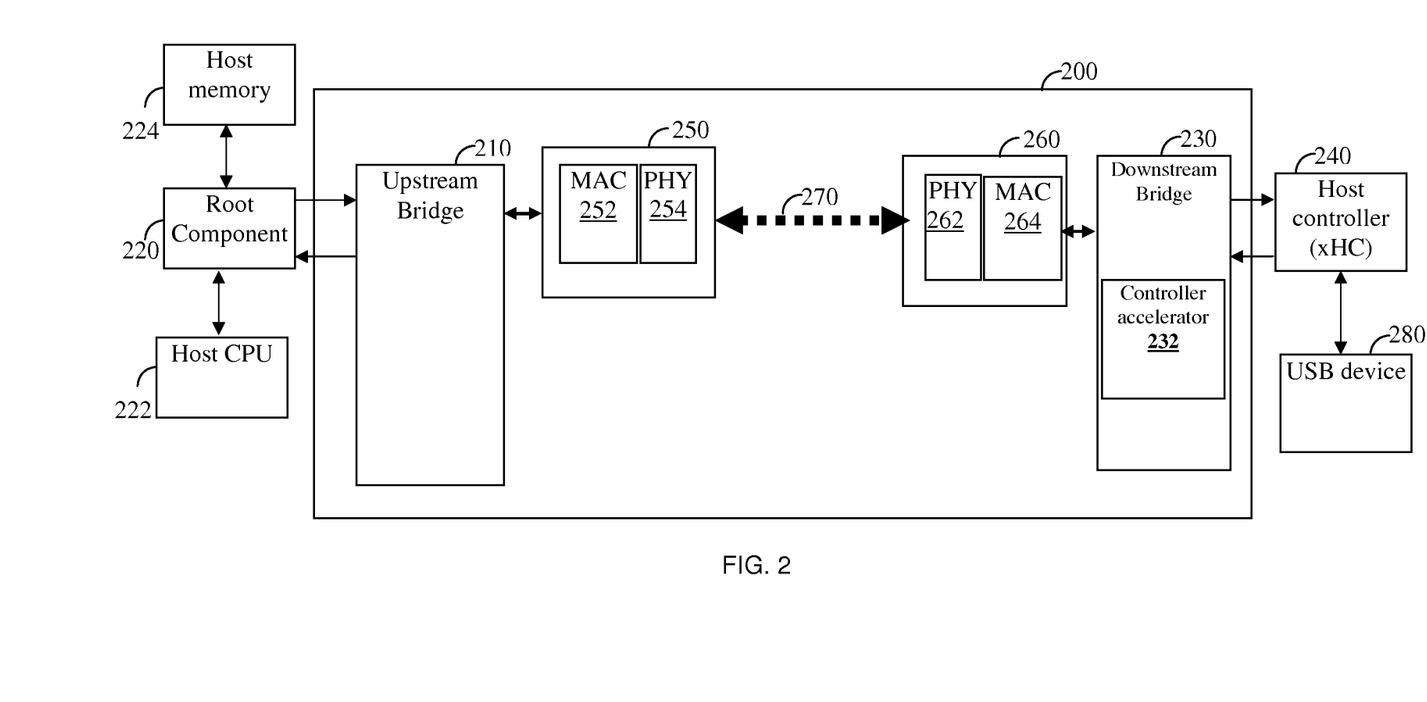
FIG. 2 is a block diagram of a distributed interconnect bus apparatus utilized to describe various embodiments disclosed herein.

An exemplary and non-limiting diagram of a distributed interconnect bus apparatus 200, utilized to describe various embodiments the invention, is shown in FIG. 2. The apparatus 200 comprises an upstream bridge 210 connected to a root component 220 and a downstream bridge 230 connected to a host controller 240. The upstream and downstream bridges 210 and 230 communicate over a link 270 which is the medium used to transfer the data between the components 220 and 240. The medium may be, but is not limited to, air, a copper cable, a fiber optic, and so on. That is, the bus apparatus 200 forms a distributed bus for transferring data between remote peripheral devices coupled to the root component 220 and the endpoint component 240. The root component 220 acts as a host bridge of a computing device to which at least a host CPU 222 and a host memory 224 are coupled.

In the preferred embodiment illustrated in FIG. 2, the downstream bridge 230 is coupled to an extensible host controller interface (hereinafter "host controller") 240 which is connected to a USB device 280. The USB device 280 and the host controller 240 may be compatible with at least USB 1.x, 2.0, and 3.0 USB devices. In one embodiment, the root component 220 and host controller 240 are PCIe components, and the bridges 210 and 230 implement the PCIe protocol. Thus, the distributed interconnect bus apparatus 200 is compliant with the PCIe protocol, for example, version 2.1 and its preceding versions. The connection between the host controller 240 and the USB device 280 is a USB connection and the connection between the downstream bridge 230 and the host controller 240 is through a PCIe bus.

The transport protocol used to carry data between the components 220 and 240 may be, but is not limited to, WiGig, IEEE 802.11x (Wi-Fi), Ethernet, Infiniband, and the like. With this aim, each of the bridges 210 and 230 includes or is connected to a physical (PHY) layer module (254, 262) and a MAC layer module (252, 264) of a transceiver (250, 260) compliant with the transport protocol. For example, the transceivers 250, 260 may be wireless modems.

According to various embodiments disclosed herein, in order to accelerate the performance of read operations in the distributed interconnect bus apparatus 200, the downstream bridge 230 comprises a controller accelerator 232 described in detail below. In a normal operation of a PCIe bus, the components 220, 240 support the TRBs transfers as required by the host controller 240 and a software application executed by a Host CPU 222 over the wireless link 270. As noted above, this requires transfer of at least TRBs and data blocks pointed by the TRBs. As further noted above, if the link 270 fails or suffers from high interferences, the performance of the distributed bus 200 is significantly degraded.

According to one embodiment, the accelerator 232 emulates the operation of the host controller 240 for at least pre-fetching of TRBs and data pointed by the TRBs. The TRBs required to be pre-fetched are determined through a synchronization process, through which the accelerator 232 tries to synchronize on at least one ring (that serves an endpoint or a USB device) that includes TRBs and data pointed thereto which would likely be requested by the host controller 240. The accelerator 232 further synchronizes the completion messages and instructs the host controller 240 to perform a different task when data requested by the host controller 240 is not ready.

Figure 4:
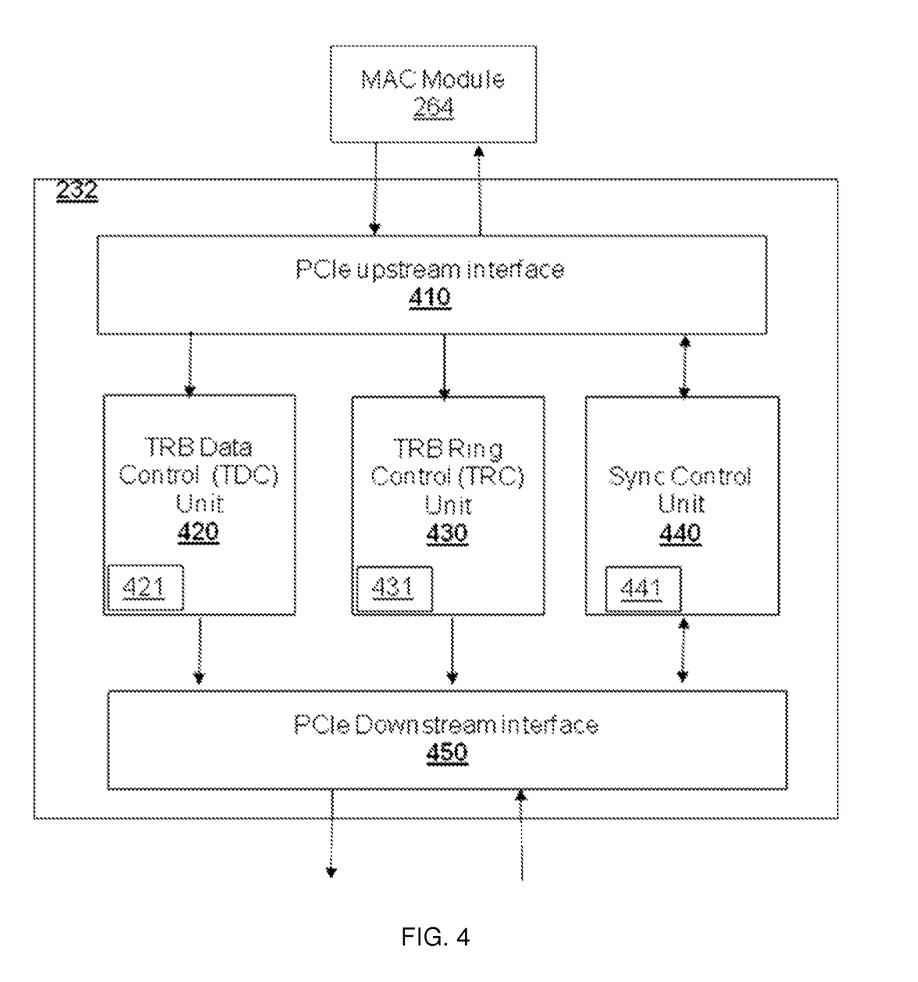
FIG. 4 a block diagram of a controller accelerator implemented according to one embodiment.

FIG. 4 shows an exemplary and non-limiting block diagram of the controller accelerator 232 according to one embodiment. The accelerator 232 includes a PCIe upstream interface 410 for interfacing with the MAC 264, a TRB data control (TDC) unit 420, a TRB Ring control (TRC) unit 430, a synchronization (SYNC) control unit 440, and an upstream interface 410 for interfacing with the host controller 240.

The SYNC control unit 440 monitors all transaction flows between the MAC module 264 and a host controller 240 to determine if there are TRBs of interest to the accelerator 232. Specifically, pre-fetching of such TRBs accelerates the performance of the distributed apparatus bus 200. The determination may be performed on any type of TRB, such as Isochronous (ISO) TRBs, bulk data TRBs, control TRBs, interrupt TRBs, a vendor specific TRB, and so on. The type of a TRB is defined in the TRB field type. The SYNC control unit 440 can simultaneously track different types of TRBs. Once the SYNC control unit 440 identifies TRBs of interest, the unit 440 locks on their respective ring, such that the subsequent TRBs from the ring can be pre-fetched by the accelerator 232.

In one embodiment, the SYNC control unit 440 identifies the TRBs of interest by monitoring read requests issued by the host controller 240 (connected to the downstream interface 450) and read completion messages received from the root 220 through the upstream interface 410. For each read request and completion message the unit 440 detects at least the type of the TRB, its address space, and the direction of the data (i.e., whether the data is required to be read or written from the host memory). The SYNC control unit 440 attempts to detect a certain pattern in subsequent TRBs requested by the host controller 240 based in part on their address space. If such a pattern is found, the SYNC control unit 440 locks on the respective ring and instructs the TRC unit 430 to pre-fetch subsequent TRBs from the ring. As a result, future requests for the TRB from the "locked" ring will be served by the TRC unit 430.

Figure 5:
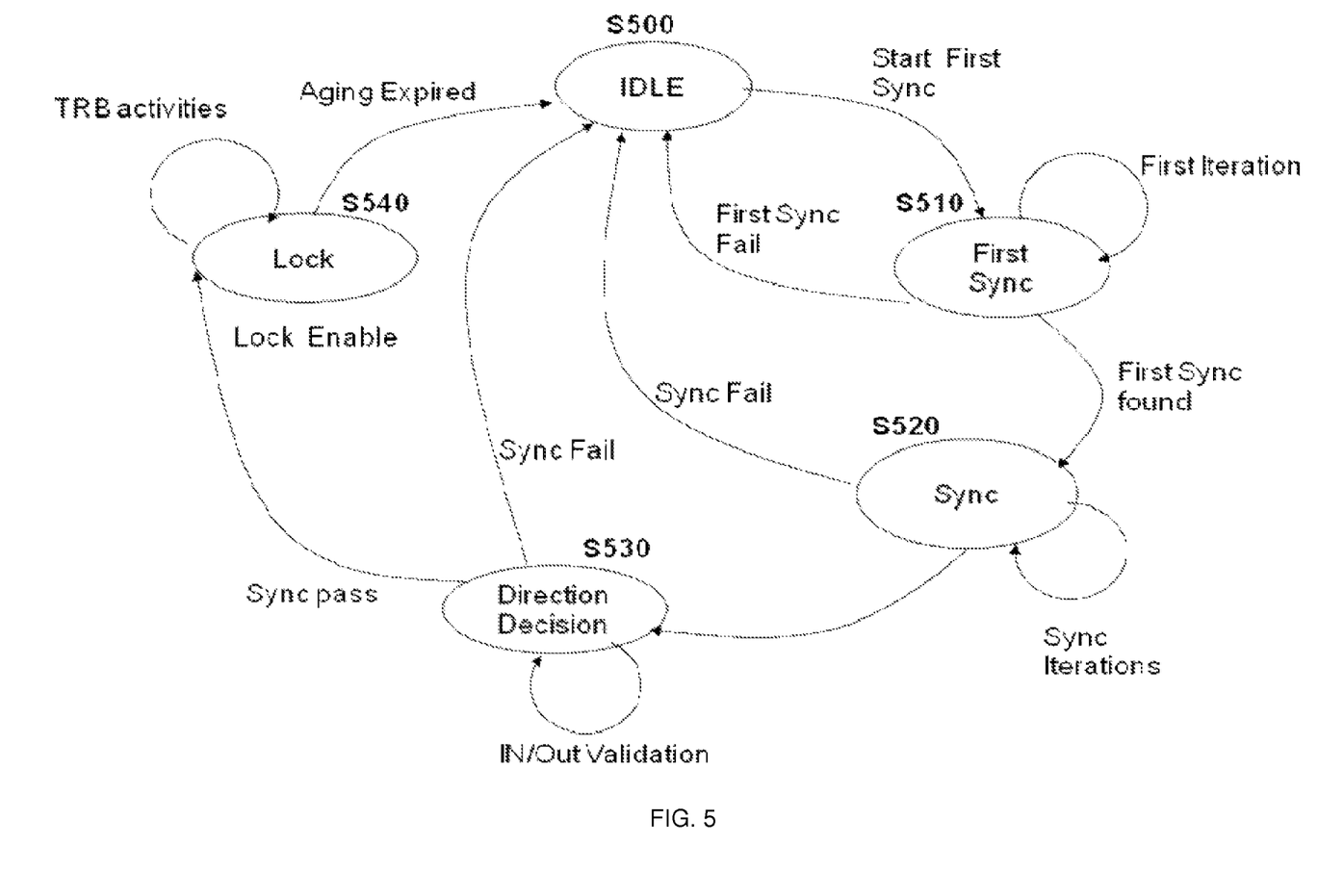
FIG. 5 is a flowchart illustrating the operation of a controller accelerator when synchronizing on a ring according to one embodiment.

Referring now to FIG. 5, where the synchronization process for locking on a ring assigned to an endpoint (a USB device) and TRBs of interest, as performed by the SYNC control unit 440, is shown. The process is described with a reference to a specific embodiment where the TRBs tracked by the unit are of an Isochronous (Isoch) TRB type. However, this process can be performed for other types of TRBs including, but not limited to, bulk data, control interrupt, and vendor specific TRBs.

From an idle state (S500), the process proceeds to S510 where it waits for a first valid Isoch TRB type. That is, at S510, the unit 440 monitors the PCIe transactions to detect a first request to a TRB that includes an Isoch field. If such a TRB is detected the address of the TRB in the host memory 224 is stored in an internal memory 441 of the SYNC control unit 440. Then, the process advances to S520 where the unit 440 waits to receive a predefined number of subsequent Isoch type TRBs residing in a continuous address space following the first identified TRB. If such TRBs were received, the unit 440 stores the address of any TRBs received and then proceeds to S530. If the SYNC control unit 440 does not detect a subsequent Isoch type TRB or a first Isoch type TRB that matches a look-for pattern, execution returns to an idle state.

At S530, the direction of the TRBs identified at S520 is determined, i.e., whether the host controller 240 reads or writes data to the host memory 224. Then the unit 440 advances to a lock state S540, where it senses activities from the TRB ring containing the identified TRBs. If an activity is not detected for that ring, during a predefined amount of time, the lock state is released, and then returns to an idle state S500. The lock is performed from the last TRB pointer. It should be noted that at states S510, S520, and S530, the unit waits a predefined period of time for a predefined number of transactions in an attempt to identify TRBs. The waiting time and number of transactions are configurable parameters of the SYNC control unit 440.

Returning back to FIG. 4, the TRC unit 430 receives from the SYNC control unit 440 a last TRB pointer for each ring being locked. In response, the TRC unit 430 retrieves a predefined number of subsequent TRBs from the ring and stores them in an internal cache memory 431. In the memory 431, the TRC unit 430 maintains for each ring, a buffer for storing a predefined number of subsequent TRBs fetched from the ring. In one embodiment, in order to retrieve the TRBs from the host memory 224, the TRC unit 430 scans the ring and either advances to the next location of a TRB or to a next link pointer when a link TRB is detected, and issues a read request to the host memory 224 starting from the next TRB address (based on the last TRB pointer provided by the unit 440). Each TRB read from the host memory 224 is saved in the memory 431. The Enqueue Pointer is advanced at any time that a retrieved TRB is saved to the memory 431.

The TRC unit 430 interfaces with the host controller 240 through the Downstream interface 450 to provide the pre-fetched TRBs stored in the memory 431. Further, for each of the TRBs sent to the host controller 240 from the memory 431, the TRC unit 430 generates a read completion message for each transfer of a TRB on behalf of the root 210, and sends such a message to the host controller 240.

As noted above, during the TRB retrieval, the TRC unit 430 scans the ring and if a link TRB (i.e., a TRB that links to a different segment in the host memory) is detected, a new read request with the address pointed by the TRB link is issued. For each completed read request, a read completion message is sent to the TRC unit 430 and a new read request is generated thereafter. It should be noted that the TRC unit 430 issues read requests until all TRBs have been retrieved from the respective ring or the memory 431 is full.

The TDC unit 420, among other tasks, pre-fetches data blocks pointed by TRBs provided by the TRC unit 430. With this aim, the TDC unit 420 receives at least one TRB from the TRC unit 430, scans the ring respective of the received TRB, extracts data pointers from the ring, and pre-fetches data pointed by the data points to an internal cache memory 421 (from the host memory 224). A data read request generated by the host controller 240 is handled by the TDC unit 420 which provides the host controller with the requested data directly from the internal memory 421. For each data transfer to the host controller 240, the TDC unit 420 generates and sends a data read completion message to the host controller 240. It should be noted that when the SYNC control unit 440 stops the lock, the TRC unit 430 informs the TDC 420 that the lock has been released and all the data saved in the internal memory 421 is deleted.

Figure 6:
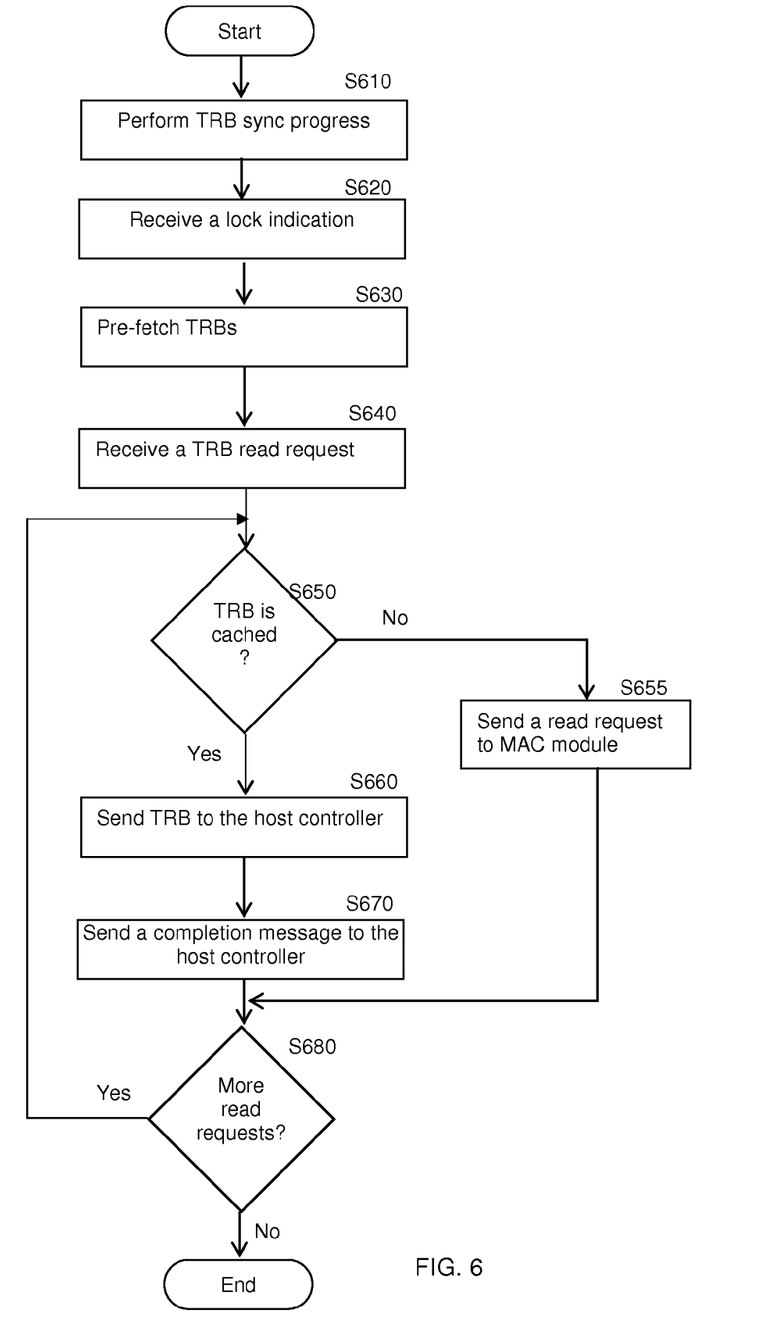
FIG. 6 is a flowchart illustrating the operation of the controller accelerator when handling a TRB read request according to one embodiment.

FIG. 6 shows an exemplary and non-limiting flowchart 600 illustrating the operation of the controller accelerator 232 for handling read requests of TRBs according to one embodiment. At S610, a TRB synchronization process is performed by the SYNC control unit 440 to detect TRBs and their rings that should be tracked by the accelerator 232. That is, the unit 440 synchronizes on at least one ring assigned to an endpoint (e.g., a USB device). As discussed in detail above with respect to FIG. 5, the TRB synchronization process attempts to detect requests directed to TRBs having a certain type and that reside in a continuous address space in the host memory 224. During the synchronization process (S610), the accelerator 232 operates in a bypass mode in which all PCIe transactions are sent either to the MAC module 264 (through interface 410) or to the host controller 240 (through interface 450).

At S620, once the SYNC control unit 440 locks, it provides the TRC unit 430 with a last TRB pointer for each ring from which TRBs can be pre-fetched. At S630, the TRC unit 430 pre-fetches TRBs starting from the last TRB pointer. In one embodiment, S630 includes scanning the ring pointed by the provided pointer and retrieves the TRBs in that ring. As noted above, the TRC unit 430 can retrieve TRBs or linked TRBs. The TRBs are pre-fetched from the host memory 224 and saved in the internal cache memory 431.

At S640, a TRB read request issued by the host controller 240 is received at the accelerator 232. At S650, it is checked if the received request is for a TRB saved in the memory 431, and if so execution continues with S660; otherwise, at S655 the request is sent directly to the MAC module 264. Alternatively, at S665, a dummy TRB is returned to the host controller 240.

At S660, the TRB requested by the host controller 240 is sent from the memory 431 to the host controller 240. Thereafter, at S670, a TRB read completion message is generated by the TRC unit 430 and sent to the host controller 240. At S680, another check is made to determine if additional TRB read requests have been made, and if so execution returns to S650; otherwise, execution ends. It should be noted that the accelerator 232 serves TRB read requests as long as there are TRBs saved in memory 431 or when the SYNC control unit 440 releases the TRB lock and moves to an IDLE state (see S540; S550 FIG. 5).

Figure 7:
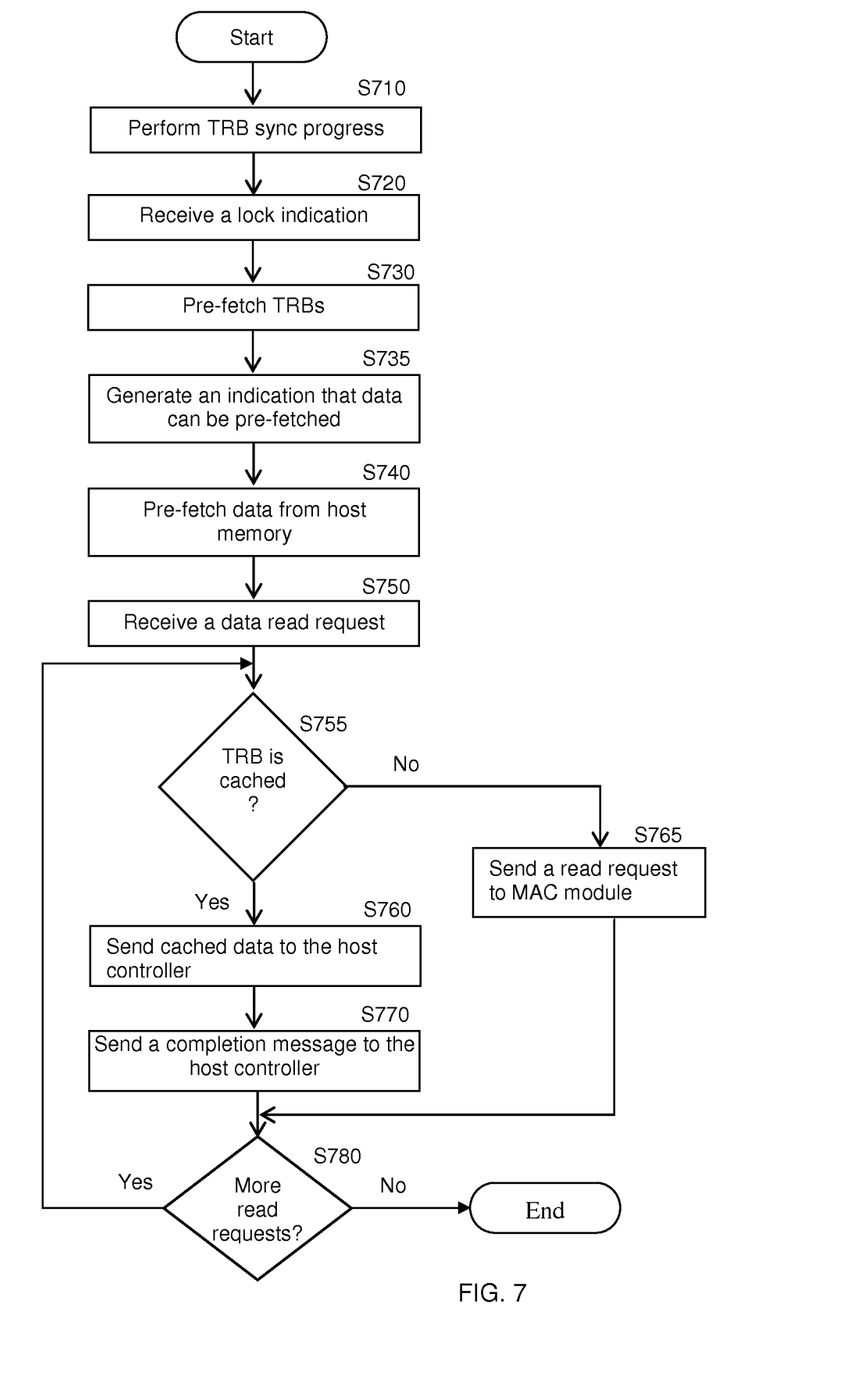
FIG. 7 is a flowchart illustrating the operation of the controller accelerator when handling a data read request according to one embodiment.

FIG. 7 shows an exemplary and non-limiting flowchart 700 illustrating the operation of controller accelerator 232 for handling data read requests of TRBs according to one embodiment.

At S710, a TRB synchronization process is performed by the SYNC control unit 440 to detect TRBs and their rings that should tracked by the accelerator 232. That is, the unit 440 synchronizes on at least one ring assigned an endpoint (e.g., a USB device) looking for a TRB's lock pattern. The TRB synchronization process is discussed in detail above. At S720, once the SYNC control unit 440 locks, it provides the TRC unit 430 with a last TRB pointer for each ring from which TRBs can be pre-fetched. At S730, the TRC unit 430 pre-fetches TRBs starting from the last TRB pointer. The TRBs are pre-fetched from the host memory 224 and saved in the internal cache memory 431.

At S735, the TRC unit 430 instructs the TDC unit 420 to retrieve data pointed by the TRBs pre-fetched by the TDC unit 420. S735 is performed after one or more TRBs have been retrieved. At S740, the TDC unit 420 monitors TRBs retrieved by the TRC unit 430 and pre-fetched data from the host memory 214 pointed by the TRBs. As discussed above, in one embodiment, S740 includes scanning the ring that maintains the pre-fetched TRBs for data buffer pointers and then issuing data read requests to the host memory to retrieve data from an address space pointed by the data buffer pointers. The data retrieved from the host memory 224 and the data buffer pointers are saved in the internal cache memory 421 of the TDC unit 420.

At S750, a data read request issued by the host controller 240 is received at the accelerator 232. At S755, it is checked if the received request is for data saved in the memory 431, and if so, execution continues with S760; otherwise, at S765 the request is sent directly to the MAC module 264. Alternatively, at S765, a dummy TRB is returned to the host controller. In one embodiment, S750 includes matching the address designated in the data read request to the data buffer pointers saved in the internal memory 421.

At S760, the data requested in the received read request is sent from the memory 421 to the host controller 240. Thereafter, at S770, a data read completion message is generated by the TDC unit 420 and sent to the host controller 240. At S780, another check is made to determine if additional data read requests have been made, and if so execution returns to S755;

otherwise, execution ends. It should be noted that the accelerator 232 serves data read requests until the SYNC control unit 440 releases the TRB lock and moves to an idle state (see S540; S550 FIG. 5).

According to an embodiment disclosed herein, if a data block or a TRB requested by the host controller 240 is not ready to be transferred by the accelerator 232, a dummy TRB is generated and returned to the host controller 240. In one embodiment, the dummy TRB includes one or more No Op commands. Such a command exercises the TRB ring without affecting the host controller 240 or a USB device 280. When the host controller 240 returns to the accelerator 232 to request another TRB in response to the dummy TRB, then if the data is ready, the accelerator 232 sends the data to the host controller 240; otherwise, another No Op command is generated.

The dummy TRB provides a quick response to the host controller 240 even if the data or TRB is not ready (i.e., not cached in either of the memory 421 or 431). As a result, instead of waiting for the data, the host controller 240 can switch to another critical ring. This is particularly important when the USB device plays multimedia content. When the entire video data has not been pre-fetched by the accelerator 232, a dummy TRB releases the host controller 240 from waiting for such data and switches to a different ring which would typically maintain the audio data. This eliminates noise sounds while the USB device waits for the video data.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for accelerating execution of read operations, comprising:
monitoring transactions to and from a host controller;
synchronizing on at least one ring assigned to a universal serial bus (USB) device, wherein the synchronizing comprises determining a pattern associated with transfer request block (TRB) address spaces of the monitored transactions;
pre-fetching TRBs maintained in the at least one ring, wherein the TRBs are saved in a host memory based at least in part on the pattern;
saving the pre-fetched TRBs in an internal cache memory;
receiving a TRB read request from the host controller requesting a TRB;
transferring the requested TRB from the internal cache memory to the host controller; and
sending a TRB read completion message to the host controller.

2. The method of claim 1, further comprising:
receiving another TRB read request from the host controller requesting another TRB;
checking if the other TRB resides in the internal cache memory; and
sending a dummy TRB if the other TRB does not reside in the internal cache memory.

3. The method of claim 2, wherein the dummy TRB includes at least one No-Op command causing the host controller to retrieve one or more TRBs from a different ring.

4. The method of claim 1, wherein synchronizing on the at least one ring further comprises:
identifying a first TRB associated with a certain TRB type;
receiving a plurality of TRBs residing in a continuous address space, in the host memory, following the first identified TRB;
determining a direction of the at least one ring associated with the plurality of TRBs based on the monitoring; and
locking on the at least one ring in the determined direction.

5. The method of claim 4, further comprising:
releasing the lock on the at least one ring if no activity in the at least one ring is detected during a period of time.

6. The method of claim 1, wherein pre-fetching the TRBs maintained in the at least one ring comprises:
scanning the at least one ring starting at an address in the host memory identified by a TRB pointer to detect TRBs and linked TRBs; and
issuing a read request to the host memory for each detected TRB and for each detected linked TRB.

7. The method of claim 1, further comprising:
saving the pre-fetched TRBs in a second internal cache memory; and
sending a TRB read completion message to the host controller for each of the pre-fetched TRBs sent to the host controller from the second internal cache memory.

8. The method of claim 1, further comprising:
checking if a requested data block designated in the read request resides in the internal cache memory; and
sending a dummy TRB if the requested data block does not reside in the internal cache memory, wherein the dummy TRB includes at least one No-Op command causing the host controller to retrieve data blocks from a different ring.

9. The method of claim 1, further comprising:
scanning the at least one ring maintaining the pre-fetched TRBs to detect data buffer pointers; and
issuing a data read request to the host memory for an address space in the host memory identified by each of the data buffer pointers to retrieve, from the host memory, data blocks pointed by the pre-fetched TRBs.

10. A controller apparatus, comprising:
an accelerator configured to:

monitor transactions to and from a host controller;
synchronize on at least one ring assigned to a universal serial bus (USB) device, wherein the synchronizing comprises determining a pattern associated with transfer request block (TRB) address spaces of the monitored transactions;
pre-fetch TRBs maintained in the at least one ring, wherein the TRBs are saved in a host memory based at least in part on the pattern;
save the pre-fetched TRBs in an internal cache memory;
receive a TRB read request from the host controller requesting a TRB;
transfer the requested TRB from the internal cache memory to the host controller; and
send a TRB read completion message to the host controller.

11. The controller apparatus of claim 10, wherein the accelerator is further configured to:
receive another TRB read request from the host controller requesting another TRB;
check if the other TRB resides in the internal cache memory; and
send a dummy TRB if the other TRB does not reside in the internal cache memory.

12. The controller apparatus of claim 11, wherein the dummy TRB includes at least one No-Op command causing the host controller to retrieve one or more TRBs from a different ring.

13. The controller apparatus of claim 10, wherein the accelerator is further configured to synchronize on the at least one ring by:
identifying a first TRB associated with a certain TRB type;
receiving a plurality of TRBs residing in a continuous address space, in the host memory, following the first identified TRB;
determining a direction of the at least one ring associated with the plurality of TRBs based on the monitoring; and
locking on the at least one ring in the determined direction.

14. The controller apparatus of claim 10, wherein the accelerator is further configured to release the lock on the at least one ring if no activity in the at least one ring is detected during a period of time.

15. The controller apparatus of claim 10, wherein the accelerator is configured to pre-fetch the TRBs maintained in the at least one ring by:
scanning the at least one ring starting at an address in the host memory identified by a TRB pointer to detect TRBs and linked TRBs; and
issuing a read request to the host memory for each detected TRB and for each detected linked TRB.

16. The controller apparatus of claim 10, wherein the accelerator is further configured to:
save the pre-fetched TRBs in a second internal cache memory; and
send a TRB read completion message to the host controller for each of the pre-fetched TRBs sent to the host controller from the second internal cache memory.

17. The controller apparatus of claim 10, wherein the accelerator is further configured to:
check if a requested data block designated in the read request resides in the internal cache memory; and
send a dummy TRB if the requested data block does not reside in the internal cache memory, wherein the dummy TRB includes at least one No-Op command causing the host controller to retrieve data blocks from a different ring.

18. The controller apparatus of claim 10, wherein the accelerator is further configured to:
scan the at least one ring maintaining the pre-fetched TRBs to detect data buffer pointers; and
issue a data read request to the host memory for an address space in the host memory identified by each of the data buffer pointers to retrieve, from the host memory, data blocks pointed by the pre-fetched TRBs.

19. A non-transitory computer-readable medium having instructions executable to:
monitor transactions to and from a host controller;
synchronize on at least one ring assigned to a universal serial bus (USB) device, wherein the synchronizing comprises determining a pattern associated with transfer request block (TRB) address spaces of the monitored transactions;
pre-fetch TRBs maintained in the at least one ring, wherein the TRBs are saved in a host memory based at least in part on the pattern;
save the pre-fetched TRBs in an internal cache memory;
receive a TRB read request from the host controller requesting a TRB;
transfer the requested TRB from the internal cache memory to the host controller; and
send a TRB read completion message to the host controller.

20. An apparatus for accelerating execution of read operations, comprising:
means for monitoring transactions to and from a host controller;
means for synchronizing on at least one ring assigned to a universal serial bus (USB) device, wherein the synchronizing comprises determining a pattern associated with transfer request block (TRB) address spaces of the monitored transactions;
means for pre-fetching TRBs maintained in the at least one ring, wherein the TRBs are saved in a host memory based at least in part on the pattern;
means for saving the pre-fetched TRBs in an internal cache memory;
means for receiving a TRB read request from the host controller requesting a TRB;
means for transferring the requested TRB from the internal cache memory to the host controller; and
means for sending a TRB read completion message to the host controller.

21. A computing device comprising:
an upstream bridge coupled to a host memory;
a downstream bridge coupled to a host controller; and
a controller accelerator configured to:
monitor transactions to and from the host controller;
synchronize on at least one ring assigned to a universal serial bus (USB) device, wherein the synchronizing comprises determining a pattern associated with transfer request block (TRB) address spaces of the monitored transactions;
pre-fetch TRBs on the at least one ring via the upstream bridge, wherein the TRBs are saved in the host memory based at least in part on the pattern;
save the pre-fetched TRBs in an internal cache memory;
receive a TRB read request from the host controller via the downstream bridge requesting a TRB;
transfer the requested TRB from the internal cache memory to the host controller via the downstream bridge; and send a TRB read completion message to the host controller via the downstream bridge.

\* \* \* \* \*